(12) United States Patent
Park et al.

(10) Patent No.: US 11,081,694 B2
(45) Date of Patent: Aug. 3, 2021

(54) POSITIVE ELECTRODE ACTIVE MATERIAL FOR SECONDARY BATTERY, AND SECONDARY BATTERY COMPRISING THE SAME

(71) Applicant: LG Chem, Ltd., Seoul (KR)

(72) Inventors: Byung Chun Park, Daejeon (KR); Wang Mo Jung, Daejeon (KR); Seong Hoon Kang, Daejeon (KR); Ju Kyung Shin, Daejeon (KR); Sang Min Park, Daejeon (KR); Sang Wook Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 15/760,111

(22) PCT Filed: Nov. 30, 2016

(86) PCT No.: PCT/KR2016/014004
§ 371 (c)(1),
(2) Date: Mar. 14, 2018

(87) PCT Pub. No.: WO2017/095153
PCT Pub. Date: Jun. 8, 2017

(65) Prior Publication Data
US 2018/0261842 A1     Sep. 13, 2018

(30) Foreign Application Priority Data

Nov. 30, 2015  (KR) .................. 10-2015-0168679
Nov. 30, 2016  (KR) .................. 10-2016-0161896

(51) Int. Cl.
| | |
|---|---|
| *H01M 4/525* | (2010.01) |
| *H01M 4/505* | (2010.01) |
| *H01M 10/0525* | (2010.01) |
| *C01G 53/00* | (2006.01) |
| *H01M 4/131* | (2010.01) |
| *H01M 10/052* | (2010.01) |
| *H01M 4/02* | (2006.01) |

(52) U.S. Cl.
CPC ............ *H01M 4/525* (2013.01); *C01G 53/50* (2013.01); *C01G 53/66* (2013.01); *H01M 4/131* (2013.01); *H01M 4/505* (2013.01); *H01M 10/052* (2013.01); *H01M 10/0525* (2013.01); *C01P 2002/50* (2013.01); *C01P 2002/52* (2013.01); *C01P 2004/03* (2013.01); *C01P 2004/51* (2013.01); *C01P 2004/61* (2013.01); *C01P 2006/10* (2013.01); *C01P 2006/12* (2013.01); *C01P 2006/40* (2013.01); *H01M 2004/021* (2013.01); *H01M 2004/028* (2013.01)

(58) Field of Classification Search
CPC ...... H01M 4/525; H01M 4/131; H01M 4/505; H01M 10/052; H01M 10/0525; H01M 2004/021; H01M 2004/028; C01G 53/50; C01G 53/66; C01P 2004/51; C01P 2004/61; C01P 2006/10; C01P 2006/12; C01P 2006/40; C01P 2002/50; C01P 2002/52; C01P 2004/03
USPC ........................................................ 252/500
See application file for complete search history.

(56) References Cited

U.S. PATENT DOCUMENTS

| | | | |
|---|---|---|---|
| 2003/0129495 A1 | 7/2003 | Yamato et al. | |
| 2009/0068561 A1* | 3/2009 | Sun ................ | H01M 4/505 429/223 |
| 2010/0288969 A1 | 11/2010 | Koga et al. | |
| 2011/0033750 A1* | 2/2011 | Hosokawa ........... | C01G 53/006 429/223 |
| 2011/0297876 A1* | 12/2011 | Masukuni .......... | C01G 45/1242 252/182.1 |
| 2012/0070743 A1 | 3/2012 | Kwon et al. | |
| 2012/0231327 A1 | 9/2012 | Hiratsuka | |
| 2012/0282524 A1 | 11/2012 | Kono et al. | |
| 2013/0089787 A1* | 4/2013 | Nagai ................ | H01M 4/485 429/223 |
| 2013/0202966 A1 | 8/2013 | Yu et al. | |
| 2014/0106228 A1 | 4/2014 | Toya et al. | |
| 2014/0162127 A1 | 6/2014 | Kim et al. | |
| 2015/0104704 A1 | 4/2015 | Kim et al. | |
| 2015/0162598 A1 | 6/2015 | Kim et al. | |
| 2015/0180025 A1 | 6/2015 | Mitsumoto et al. | |
| 2015/0194673 A1 | 7/2015 | Takagi et al. | |

(Continued)

FOREIGN PATENT DOCUMENTS

| | | |
|---|---|---|
| CN | 102668188 A | 9/2012 |
| CN | 102714311 A | 10/2012 |

(Continued)

OTHER PUBLICATIONS

Extended European Search Report including Written Opinion for EP16871049.9 dated Nov. 6, 2018.

(Continued)

*Primary Examiner* — Tanisha Diggs
(74) *Attorney, Agent, or Firm* — Lerner, David, Littenberg, Krumholz & Mentlik, LLP (57) ABSTRACT

The present invention provides a positive electrode active material for a secondary battery, the positive electrode active material being a primary particle having a monolithic structure that includes a lithium composite metal oxide of Formula 1 below, wherein the primary particle has an average particle size ($D_{50}$) of 2 µm to 20 µm and a Brunauer-Emmett-Teller (BET) specific surface area of 0.15 m$^2$/g to 1.9 m$^2$/g, and a secondary battery including the same.

17 Claims, 1 Drawing Sheet

(56) References Cited

U.S. PATENT DOCUMENTS

2016/0276664 A1    9/2016   Gunji et al.
2018/0261842 A1*   9/2018   Park .................... H01M 10/052

FOREIGN PATENT DOCUMENTS

| | | | | |
|---|---|---|---|---|
| CN | 103563137 A | | 2/2014 | |
| CN | 104241633 | * | 12/2014 | |
| EP | 2717361 A1 | | 4/2014 | |
| JP | H1074515 A | | 3/1998 | |
| JP | 2001302244 A | | 10/2001 | |
| JP | 2003123748 A | | 4/2003 | |
| JP | 2003168434 A | | 6/2003 | |
| JP | 2003217587 A | | 7/2003 | |
| JP | 2004196579 A | | 7/2004 | |
| JP | 2006332020 A | | 12/2006 | |
| JP | 2009525578 A | | 7/2009 | |
| JP | 2010073686 A | * | 4/2010 | |
| JP | 2011165326 A | | 8/2011 | |
| JP | 2011233369 A | | 11/2011 | |
| JP | 2011238416 A | | 11/2011 | |
| JP | 2012209242 A | | 10/2012 | |
| JP | 2012216547 A | | 11/2012 | |
| JP | 2013517599 A | | 5/2013 | |
| JP | 2013161644 A | | 8/2013 | |
| JP | 2014107033 A | | 6/2014 | |
| JP | 2014116308 A | | 6/2014 | |
| JP | 2015525950 A | | 9/2015 | |
| JP | 2015528181 A | | 9/2015 | |
| KR | 20020070495 A | * | 9/2002 | |
| KR | 20020070495 A | | 9/2002 | |
| KR | 20050052266 A | | 6/2005 | |
| KR | 20110083383 A | | 7/2011 | |
| KR | 20120030774 A | | 3/2012 | |
| KR | 20120030774 A | * | 3/2012 | ............ C01G 53/50 |
| KR | 20130012007 A | | 1/2013 | |
| KR | 101452950 B1 | | 10/2014 | |
| WO | 2009063630 A1 | | 5/2009 | |
| WO | 2011111377 A1 | | 9/2011 | |
| WO | 2012086273 A1 | | 6/2012 | |
| WO | 2014010730 A1 | | 1/2014 | |
| WO | 2014034430 A1 | | 3/2014 | |
| WO | 2015151606 A1 | | 10/2015 | |

OTHER PUBLICATIONS

Search report from International Application No. PCT/KR2016/014004, dated Mar. 7, 2017.

Chinese Search Report for Application No. 2016800572686, dated Feb. 19, 2021, 7 pages.

\* cited by examiner

POSITIVE ELECTRODE ACTIVE MATERIAL FOR SECONDARY BATTERY, AND SECONDARY BATTERY COMPRISING THE SAME

CROSS-REFERENCE TO RELATED APPLICATION

The present application is a national phase entry under 35 U.S.C. § 371 of International Application No. PCT/KR2016/014004 filed Nov. 30, 2016, published in Korean, which claims priority from Korean Patent Application No. 10-2015-0168679, filed on Nov. 30, 2015 and Korean Patent Application No. 10-2016-0161896, filed Nov. 30, 2016, all of which are incorporated herein in their entirety by reference.

TECHNICAL FIELD

The present invention relates to a positive electrode active material for a secondary battery that has a stable monolithic structure, thereby being capable of improving high-temperature stability and capacity characteristic of a battery, and a secondary battery including the same.

BACKGROUND ART

As technology development and demand for mobile devices increase, demand for secondary batteries as energy sources is sharply increasing. Among the secondary batteries, a lithium secondary battery that has high energy density and voltage, a long cycle lifespan, and a low self-discharge rate is commercialized and being widely used.

However, the lithium secondary battery has a problem in that its life sharply decreases as charge and discharge are repeated. Particularly, such a problem is more serious at high temperature. This is a phenomenon that occurs due to decomposition of an electrolyte, deterioration of an active material, and an increase in an internal resistance of a battery due to moisture in the battery or other reasons.

Accordingly, a positive electrode active material for a lithium secondary battery that is currently being vigorously researched, developed, and used is $LiCoO_2$ having a layered structure. Although $LiCoO_2$ is used the most due to its excellent lifespan characteristics and charge/discharge efficiency, there is a limitation for $LiCoO_2$ to be applied to a technology for increasing battery capacity due to its low structural stability.

As a positive electrode active material for substituting for $LiCoO_2$, various lithium transition metal oxides such as $LiNiO_2$, $LiMnO_2$, $LiMn_2O_4$, $LiFePO_4$, or $Li(Ni_{x1}Co_{y1}Mn_{z1})O_2$ have been developed. Among these, $LiNiO_2$ has an advantage of exhibiting a high discharge capacity as a battery characteristic. However, $LiNiO_2$ has problems in that synthesis is difficult with a simple solid state reaction and thermal stability and cycle characteristics are low. Also, lithium-manganese-based oxides such as $LiMnO_2$ and $LiMn_2O_4$ have advantages including excellent thermal stability and low cost. However, the lithium-manganese-based oxides have problems including low capacity and low high-temperature characteristics. Particularly, $LiMn_2O_4$ is commercialized in some low-cost products but has an inferior lifespan characteristic due to structural deformation (Jahn-Teller distortion) caused by $Mn^{3+}$. Also, although a large amount of research is currently being carried out on $LiFePO_4$ for use in hybrid electric vehicles (HEVs) due to low cost and excellent stability, it is difficult for $LiFePO_4$ to be applied to other fields due to low conductivity.

Due to such circumstances, a material that is currently being spotlighted the most as a positive electrode active material for substituting for $LiCoO_2$ is a lithium-nickel-manganese-cobalt-based oxide, $Li(Ni_{x2}Co_{y2}Mn_{z2})O_2$ (here, x2, y2, and z2 are atomic fractions of independent oxide-forming elements, and $0<x2\leq1$, $0<y2\leq1$, $0<z2\leq1$, $0<x2+y2+z2\leq1$). This material has advantages in that the material is less expensive than $LiCoO_2$ and can be used at high capacity and high voltage but has disadvantages in that a rate capability and lifespan characteristic at high temperature are inferior.

Generally, a positive electrode active material may have a form of a secondary particle in which small primary particles are condensed. However, in the case of the positive electrode active material that is in the above form of a secondary particle, lithium ions may react with moisture, $CO_2$, or the like in the air while moving to a surface of the active material and may easily form surface impurities such as $Li_2CO_3$ and LiOH. Because the surface impurities formed in such a way decrease battery capacity or are decomposed in a battery and generate gas and cause a swelling phenomenon, there is a serious problem in high-temperature stability.

With increasing demand for high capacity secondary batteries nowadays, there is a growing need for development of a positive electrode active material that is suitable for high capacity and capable of exhibiting high-temperature stability due to reduction of surface impurities.

DISCLOSURE

Technical Problem

A first technical object of the present invention is to provide a positive electrode active material for a secondary battery that has a stable monolithic structure, thereby being capable of improving high-temperature stability and capacity characteristics of a battery, and a fabrication method thereof.

A second technical object of the present invention is to provide a positive electrode for a secondary battery, a lithium secondary battery, a battery module, and a battery pack including the positive electrode active material.

Technical Solution

To achieve the above objects, according to an embodiment of the present invention, there is provided a positive electrode active material for a secondary battery, the positive electrode active material being a primary particle having a monolithic structure that includes a lithium composite metal oxide of Formula 1 below, wherein the primary particle has an average particle size ($D_{50}$) of 2 μm to 20 μm and a Brunauer-Emmett-Teller (BET) specific surface area of 0.15 m²/g to 1.9 m²/g.

$$Li_aNi_{1-x-y}Co_xM1_yM3_zM2_wO_2 \qquad [\text{Formula 1}]$$

(In Formula 1, M1 is at least one selected from the group consisting of Al and Mn, M2 is any one or two or more elements selected from the group consisting of Zr, Ti, Mg, Ta, and Nb, M3 is any one or two or more elements selected from the group consisting of W, Mo, and Cr, and $1.0\leq a\leq1.5$, $0<x\leq0.5$, $0\leq y\leq0.5$, $0.002\leq z\leq0.03$, $0\leq w\leq0.04$, $0<x+y\leq0.7$)

According to another embodiment of the present invention, there is provided a method of fabricating the above-described positive electrode active material for a secondary battery, the method including a step of preparing a precursor by mixing a nickel raw material, a cobalt raw material, and an M1 raw material (here, M1 is at least one element selected from the group consisting of Al and Mn) and then performing a reaction, a step of mixing the precursor with a lithium raw material and an M3 raw material (here, M3 is any one or two or more elements selected from the group consisting of W, Mo, and Cr) such that a molar ratio of Li/Me (Me=the sum of metal elements in the precursor and the element M3) is 2.0 or higher and then sintering at 700° C. to 900° C. in the presence of a boron-based sintering additive, and a step of washing a product obtained by a result of the sintering such that a molar ratio of Li/Me' (Me'=the sum of metal elements, excluding lithium, in the positive electrode active material) in the finally fabricated positive electrode active material is from 1.0 to 1.5 and then drying at 150° C. to 400° C.

According to still another embodiment of the present invention, there are provided a positive electrode for a secondary battery, a lithium secondary battery, a battery module, and a battery pack including the positive electrode active material.

Other details of the embodiments of the present invention are included in the detailed description below.

Advantageous Effects

According to the present invention, a positive electrode active material for a secondary battery has a monolithic structure and thus maintains a stable crystal structure even during charging and discharging such that there is no concern about a sharp decrease in capacity due to a change in the crystal structure and the generation of surface impurities is minimized. Accordingly, excellent high-temperature stability and capacity characteristics can be exhibited when the positive electrode active material is applied to a battery.

DESCRIPTION OF DRAWINGS

Because the following drawings attached to the present specification illustrate exemplary embodiments of the present invention and serve to facilitate understanding of the technical idea of the present invention together with the above-described content of the invention, the present invention should not be limitedly interpreted on the basis of the drawings.

BEST MODE

Figure 1:
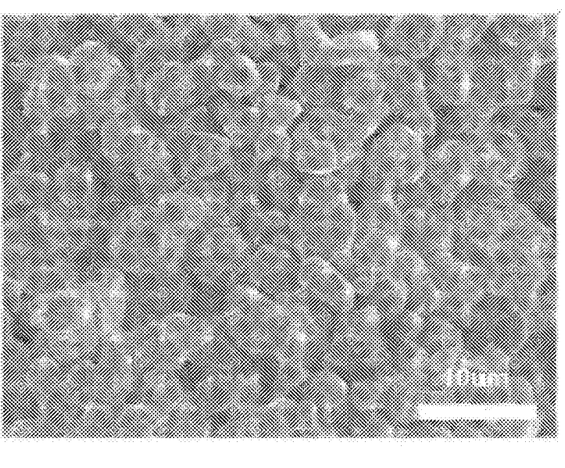
The FIGURE is a photograph of a positive electrode active material fabricated in Example 1-1 observed with a scanning electron microscope.

Hereinafter, the present invention will be described in more detail to assist understanding of the present invention.

Terms or words used in the present specification and claims are not to be limitedly interpreted as general or dictionary meanings and should be interpreted as meanings and concepts that are consistent with the technical idea of the present invention on the basis of the principle that an inventor may properly define concepts of terms to describe his or her invention in the best way.

According to an embodiment of the present invention, a positive electrode active material for a secondary battery is a primary particle having a monolithic structure that includes a lithium composite metal oxide of Formula 1 below and has an average particle size ($D_{50}$) of 2 μm to 20 μm and a Brunauer-Emmett-Teller (BET) specific surface area of 0.15 m²/g to 1.9 m²/g.

$$Li_aNi_{1-x-y}Co_xM1_yM3_zM2_wO_2 \qquad \text{[Formula 1]}$$

(In Formula 1, M1 is at least one selected from the group consisting of Al and Mn, M2 is any one or two or more elements selected from the group consisting of Zr, Ti, Mg, Ta, and Nb, M3 is any one or two or more elements selected from the group consisting of W, Mo, and Cr, and $1.0 \leq a \leq 1.5$, $0 \leq x \leq 0.5$, $0 \leq y \leq 0.5$, $0.002 \leq z \leq 0.03$, $0 \leq w \leq 0.04$, $0 < x+y \leq 0.7$)

A composition of the lithium composite metal oxide of Formula 1 above is an average composition of the entire active material.

In the present invention, "monolithic structure" refers to a structure in which particles are in a morphological phase and are present in an independent phase in which the particles are not condensed with each other. An example of a particle structure opposite to the monolithic structure may include a structure in which small-sized particles ("primary particles") are physically and/or chemically condensed and form a relatively large-sized particle ("secondary particle").

In this way, because the positive electrode active material according to the present invention has a monolithic structure, a movement path of lithium ions until the lithium ions reach a surface of the positive electrode active material becomes long. Accordingly, surface impurities formed as a result of the lithium ions being moved to the surface of the active material, reacting with moisture, $CO_2$, or the like in the air, and causing $Li_2CO_3$, LiOH, or the like to be adsorbed onto an oxide surface may be minimized. Also, numerous problems that may occur due to surface impurities, that is, a decrease in battery capacity, an increase in interfacial resistance due to interference with the movement of lithium ions, generation of gas due to decomposition of impurities, and a swelling phenomenon of a battery due to the above, may be prevented. As a result, a capacity characteristic, high-temperature stability, and a charge/discharge characteristic may be improved when the positive electrode active material is applied to a battery.

Further, because the positive electrode active material according to an embodiment of the present invention includes the lithium composite metal oxide of Formula 1, the positive electrode active material has excellent structural stability and may improve a lifespan characteristic of a battery.

In the lithium composite metal oxide of Formula 1, Li may be included at a content corresponding to a, that is, $1.0 \leq a \leq 1.5$. When a is less than 1.0, there is a concern that the capacity may be deteriorated, and when a exceeds 1.5, the particle is sintered in a sintering process and it may be difficult to fabricate an active material. In consideration of the balance between the remarkableness of the effect of improving a capacity characteristic of the positive electrode active material in accordance with control of Li content and sinterability when fabricating the active material, Li may be included at a content of, more specifically, $1.0 \leq a \leq 1.15$.

In the lithium composite metal oxide of Formula 1, Ni may be included at a content corresponding to 1-x-y, that is, a content of 1-x-y and, for example, may be included at a content of $0.3 \leq 1-x-y < 1$. In consideration of the remarkableness of the effect of improving the capacity characteristic in accordance with including Ni, the Ni may be included at a content of, more specifically $0.3 \leq 1-x-y \leq 0.6$ or $0.6 \leq 1-x-y \leq 1$.

In the lithium composite metal oxide of Formula 1, Co may be included at a content corresponding to x, that is, a content of $0 < x \leq 0.5$. When x is 0, there is a concern that the capacity characteristic may be deteriorated, and when x exceeds 0.5, there is a concern that cost may be increased. In consideration of the remarkableness of the effect of improving the capacity characteristic in accordance with including Co, the Co may be included at a content of, more specifically, $0.10 \leq x \leq 0.35$.

In the lithium composite metal oxide of Formula 1, M1 may be at least one selected from the group consisting of Al and Mn. When the M1 is Al, the lifespan characteristic of a battery may be improved by allowing an average oxidation number of the active material to be maintained. When the M1 is Mn, safety of the battery may be improved by improving structural stability of the active material.

M1 may be included at a content corresponding to y, that is, a content of $0 \leq y \leq 0.5$. When y exceeds 0.5, there is a concern that the output characteristic and the capacity characteristic of the battery may rather be deteriorated. In consideration of the remarkableness of the effect of improving a battery characteristic in accordance with including the element M1, the M1 may be included at a content of, more specifically, $0.10 \leq y \leq 0.3$.

In the lithium composite metal oxide of Formula 1, M3 is an element corresponding to Group 6 (group VIB) of the periodic table and serves to suppress particle growth during the sintering process in fabrication of an active material particle. In a crystal structure of the positive electrode active material, M3 may substitute for some of Ni, Co, or M1 and may be present at a position at which Ni, Co, or M1 should be present or may react with lithium and form a lithium oxide. Accordingly, the crystal grain size may be controlled by adjusting a content and an input timing of M3. Specifically, the M3 may be any one or two or more elements selected from the group consisting of W, V, Nb, Nd, and Mo, and more specifically, may be at least element of W and Nb. Among these, the effect of improving the output characteristic is excellent when M3 is W, and the effect of improving high-temperature durability is superior when M3 is Nb.

The M3 may be included at a content corresponding to z of the lithium composite metal oxide of Formula 1, that is, a content of $0.002 \leq z \leq 0.03$. When z is less than 0.002, it is not easy to realize an active material that satisfies the above-mentioned characteristics. As a result, the effect of improving output and lifespan characteristics may be insignificant. When z exceeds 0.03, distortion or collapse of the crystal structure may be caused. Also, battery capacity may be deteriorated by interfering with movement of lithium ions. In consideration of realization of a particle structure in accordance with content control of the element M3 and the remarkableness of the effect of improving a battery characteristic in accordance with the realization, M3 may be included at a content of, more specifically, $0.005 \leq z \leq 0.01$.

Further, the lithium composite metal oxide of Formula 1 or the elements Ni, Co, and M1 in the lithium composite metal oxide may be partially substituted or doped with another element, i.e., M2, to improve a battery characteristic by controlling a distribution of metal elements within the active material. Specifically, M2 may be any one or two or more elements selected from the group consisting of Zr, Ti, Mg, Ta, and Nb, and more specifically, may be Ti or Mg.

The element M2 may be included at an amount corresponding to w within a range not deteriorating characteristics of the positive electrode active material, that is, a content of $0 \leq w \leq 0.04$, specifically, at a content of $0 \leq w \leq 0.02$.

In the positive electrode active material, at least one metal element of nickel, M1, and cobalt included in the lithium composite metal oxide of Formula 1 may exhibit a concentration gradient that increases or decreases in the active material.

In the present invention, a concentration gradient or a concentration profile of a metal element refers to a graph showing a content of a metal element within a depth from a particle surface to a central portion when the x-axis indicates the depth from the particle surface to the central portion and the y-axis indicates a content of a metal element. For example, a positive average slope of a concentration profile signifies that a relatively larger amount of a corresponding metal element is located at a particle central portion section than at a particle surface portion, and a negative average slope thereof signifies that a relatively larger amount of a metal element is located at the particle surface portion than at the particle central portion section. According to the present invention, a concentration gradient and a concentration profile of a metal in the active material may be confirmed using methods such as x-ray photoelectron spectroscopy (XPS) (also referred to as electron spectroscopy for chemical analysis (ESCA)), an electron probe micro analyzer (EPMA), an inductively coupled plasma-atomic emission spectrometer (ICP-AES), or time-of-flight secondary ion mass spectrometry (ToF-SIMS), and specifically, when a profile of a metal element in the active material is confirmed using the XPS, an atomic ratio of a metal may be measured for each etching time while etching the active material in a direction from a particle surface toward a central portion, and a concentration profile of the metal element may be confirmed from this.

Specifically, at least one metal element of nickel, cobalt, and M1 may have a concentration gradient in which the concentration of the metal continuously changes throughout the active material particle, and the slope of the concentration gradient of the metal element may exhibit one or more values. By having a continuous concentration gradient in this way, because a sharp phase boundary region is not present from the center to the surface, a crystal structure is stabilized, and thermal stability is increased. When the slope of the concentration gradient of a metal is constant, the effect of improving structural stability may be further improved. Also, by varying a concentration of each of the metals within the active material particle by a concentration gradient, characteristics of a corresponding metal can be easily utilized, and the effect of the positive electrode active material improving battery performance can be further improved.

In the present invention, "a concentration of a metal exhibits a continuously-changing concentration gradient" means that a concentration of a metal has a gradually-changing concentration distribution throughout the active material particle. Specifically, in the concentration distribution, a change in metal concentration per 1 µm, more specifically, 0.1 µm in a particle may be a difference of 0.1 atom % to 30 atom %, more specifically, 0.1 atom % to 20 atom %, and even more specifically, 1 atom % to 10 atom %, based on a total atomic weight of a corresponding metal included in the precursor.

More specifically, a concentration of nickel included in the active material may decrease with a continuous concentration gradient in a direction from a center of the active material particle toward a surface of the particle. Here, a slope of the concentration gradient of nickel may be constant from the center of the active material particle toward the surface. In this way, when the concentration of nickel remains high at the center of the active material particle and the concentration of nickel includes a concentration gradient that gradually decreases toward the surface of the active material, thermal stability of the positive electrode active material may be improved.

A concentration of M1 included in the active material may increase with a continuous concentration gradient in a direction from the center of the active material particle toward the surface of the particle. Here, a slope of the concentration gradient of M1 may be constant from the center of the active material particle toward the surface. In this way, when the concentration of M1, in particular, manganese, remains low at the center of the active material particle and the concentration of M1 includes a concentration gradient that gradually increases toward the surface of the active material, thermal stability of the positive electrode active material may be improved without a decrease in capacity of the positive electrode active material. More specifically, the M1 may be Mn.

A concentration of cobalt included in the active material may increase with a continuous concentration gradient in a direction from the center of the active material particle toward the surface of the particle. Here, a slope of the concentration gradient of cobalt may be constant from the center of the active material particle toward the surface. In this way, when the concentration of cobalt remains low at the center of the active material and the concentration of cobalt includes a concentration gradient that gradually increases toward the surface, a capacity characteristic of the positive electrode active material may be improved while reducing a use amount of cobalt.

Nickel, M1, and cobalt, may independently exhibit a concentration gradient that changes throughout the active material particle, the concentration of nickel may decrease with a continuous concentration gradient in the direction from the center of the active material particle toward the surface thereof, and the concentrations of cobalt and M1 may independently increase with a continuous concentration gradient in the direction from the center of the active material toward the surface thereof. In this way, by including a combined concentration gradient, in which the concentration of nickel decreases and the concentrations of cobalt and M1 increase toward the surface of the active material throughout the active material, thermal stability may be improved while a capacity characteristic of the positive electrode active material is maintained.

According to an embodiment of the present invention, the positive electrode active material may have a polyhedral shape by controlling a content and an input timing of the element M3 and a heat treatment condition in the fabrication process.

Due to such a unique shape, the positive electrode active material may facilitate intercalation and deintercalation of lithium ions, and the lithium ions may move at a high speed even in the active material particle, thereby exhibiting a further improved output characteristic when the positive electrode active material is applied to a battery. More specifically, the positive electrode active material may have a rectangular parallelepiped shape or plate shape whose cross-section including a long axis that passes through the center of the particle is rectangular.

The positive electrode active material according to an embodiment of the present invention having the above structure and configuration may have an average particle size ($D_{50}$) of 2 μm to 20 μm and a Brunauer-Emmett-Teller (BET) specific surface area of 0.15 $m^2$/g to 1.9 $m^2$/g.

Generally, although an output characteristic is improved as the BET surface is larger because an ion contact surface is larger, an opportunity for lithium ions to move to a surface of an active material and react with moisture, $CO_2$, or the like in the air increases due to the large BET surface, and there is a problem in which the possibility of impurities being adsorbed onto the surface increases. When the particle size of the active material particle is too small, reversibility of charge/discharge may be deteriorated because crystals are not well-developed, and a problem in which a condensed phase may be formed occurs. However, there is a limitation in increasing a particle size in the fabrication process of an oxide, and when an average particle size is too large, efficiency of a battery with respect to weight may be deteriorated, a relatively small amount of the positive electrode active material may be included with respect to the same size, or applicability of the active material particle may be deteriorated and the positive electrode active material may be missing in a fabrication process of an electrode, thereby deteriorating battery capacity.

With respect to this, the positive electrode active material according to an embodiment of the present invention simultaneously satisfies the average particle size and BET specific surface area conditions, thereby significantly decreasing the adsorption of surface impurities and exhibiting an excellent output characteristic despite a small ion contact area. More specifically, the positive electrode active material may have an average particle size ($D_{50}$) of 2 μm to 8 μm and a BET specific surface area of 0.15 $m^2$/g to 0.5 $m^2$/g.

In the present invention, the average particle size ($D_{50}$) of the active material may be defined as a particle size based on a particle size distribution at 50%. According to the present invention, the average particle size ($D_{50}$) of the active material may be measured using, for example, electron microscopy observation using scanning electron microscopy (SEM), field emission scanning electron microscopy (FE-SEM), or the like or using a laser diffraction method. More specifically, when the average particle size ($D_{50}$) is measured using the laser diffraction method, the positive electrode active material particles may be dispersed in a dispersion medium, the dispersed particles may be introduced into a commercially available laser diffraction particle size measurement device (for example, Microtrac MT 3000), and then an ultrasonic wave of about 28 kHz may be radiated with an output of 60 W to calculate the average particle size ($D_{50}$) based on a particle size distribution at 50% in the measurement device. According to the present invention, the specific surface area of the positive electrode active material is measured using a BET method. Specifically, the specific surface area may be calculated from a nitrogen gas absorption amount at a liquid nitrogen temperature (77K) using BELSORP-mini II of BEL Japan company.

According to an embodiment of the present invention, the positive electrode active material may have a particle size distribution value (Dcnt), which is defined by Equation 1 below, of 0.5 to 1.0, more specifically, 0.55 to 0.9. When the particle size distribution value of the active material is less than 0.5, there is a concern that a process of fabricating a high-density electrode may be difficult, and when the particle size distribution value exceeds 1.0, there is a concern that rolling processability may be deteriorated.

$$Dcnt=[Dn90-Dn10]/Dn50 \quad \text{[Equation 1]}$$

(In Equation 1 above, Dn90, Dn10, and Dn50 are number average particle sizes of the active material measured under 90%, 10%, and 50%, respectively, in an absorption mode using a Microtrac particle size analyzer after the active material is left in distilled water for 3 hours)

According to an embodiment of the present invention, the positive electrode active material has the average particle size and specific surface area in the above ranges, thereby exhibiting a high rolling density of 3.0 g/cc or higher or 3.0 g/cc to 4.5 g/cc under a pressure of 2 ton·f.

By having a high rolling density in the above range, capacity per unit volume may increase and a high-temperature storage characteristic may also be improved. Also, compared to when a conventional operating voltage range is from 3.0 V to 4.35 V, the operating voltage range is expanded to 2.50 V to 4.35 V, and a discharge end voltage is lowered such that capacity can be maximized According to the present invention, a rolling density of the positive electrode active material may be measured using a general rolling density measuring device, specifically, a powder resistivity characteristic measuring device (HPRM-A1, Han Tech Company Ltd.). The rolling density may be calculated using a density of a pellet that is formed by filling an insulating mold with powder and applying a pressure in a vertical direction. The rolling density is affected by a crystal grain size and a degree of particle condensation.

According to an embodiment of the present invention, the positive electrode active material may be fabricated by a fabrication method including a step of preparing a precursor by mixing a nickel raw material, a cobalt raw material, and an M1 raw material (here, M1 is at least one element selected from the group consisting of Al and Mn) and then performing a reaction (Step 1), a step of mixing the precursor with a lithium raw material and an M3 raw material (here, M3 is any one or two or more elements selected from the group consisting of W, Mo, and Cr) such that a molar ratio of Li/Me (Me=the sum of metal elements in the precursor and the element M3) is 2.0 or higher and then sintering at 700° C. to 900° C. in the presence of a boron-based sintering additive (Step 2), and a step of washing a product obtained by a result of the sintering such that a molar ratio of Li/Me' (Me'=the sum of metal elements excluding lithium) in the finally fabricated positive electrode active material is from 1.0 to 1.5 and then drying at 150° C. to 400° C. (Step 3). Here, when the positive electrode active material further includes M2 (here, M2 is any one or two or more elements selected from the group consisting of Zr, Ti, Mg, Ta, and Nb), an M2 raw material may be added during the mixing of the raw materials of the metal elements in Step 1, or the M2 raw material may be added during the mixing with the lithium raw material in Step 2. Accordingly, according to another embodiment of the present invention, a method of fabricating the above-described positive electrode active material is provided.

Hereinafter, each of the steps will be described in detail. In the fabrication method for fabricating the positive electrode active material, Step 1 is a step of preparing a precursor by using the nickel raw material, the cobalt raw material, the M1 raw material and selectively using the M2 raw material.

Specifically, the precursor may be fabricated by adding an ammonium cation-containing complexing agent and a basic compound to a metal-containing solution, which is produced by mixing the nickel raw material, the cobalt raw material, the M1 raw material, and the M2 raw material, and performing a coprecipitation reaction. Here, a mixing ratio of the raw materials may be properly determined within the range that allows the conditions of contents of the metal elements in the finally fabricated positive electrode active material to be satisfied.

The metal-containing solution may be produced by adding the nickel raw material, the cobalt raw material, the M1-containing raw material, and selectively, the M2-containing raw material to a solvent, specifically, water or a mixture of water and an organic solvent (specifically, an alcohol or the like) that may be uniformly mixed with water. Alternatively, solutions, specifically, aqueous solutions, including the raw materials may be produced, the solutions may be mixed, and then the mixture may be used as the metal-containing solution.

An acetate, a nitrate, a sulfate, a halide, a sulfide, a hydroxide, an oxide, an oxyhydroxide, or the like may be used as the metal element-containing raw material, and the metal element-containing raw material is not particularly limited as long as the metal element-containing raw material can be dissolved in water.

For example, examples of the cobalt raw material may include $Co(OH)_2$, $CoOOH$, $Co(SO_4)_2$, $Co(OCOCH_3)_2 \cdot 4H_2O$, $Co(NO_3)_2 \cdot 6H_2O$, $COCl_2$, $Co(SO_4)_2 \cdot 7H_2O$, or the like, and any one of the above or a mixture of two or more of the above may be used as the cobalt raw material.

Examples of the nickel raw material may include $Ni(OH)_2$, $NiO$, $NiOOH$, $NiCO_3 \cdot 2Ni(OH)_2 \cdot 4H_2O$, $NiC_2O_2 \cdot 2H_2O$, $NiCl_2$, $Ni(NO_3)_2 \cdot 6H_2O$, $NiSO_4$, $NiSO_4 \cdot 6H_2O$, fatty acid nickel salts, nickel halides, or the like, and any one of the above or a mixture of two or more of the above may be used as the nickel raw material.

Examples of the manganese raw material may include manganese oxides such as $Mn_2O_3$, $MnO_2$, and $Mn_3O_4$; manganese salts such as $MnCO_3$, $MnCl_2$, $Mn(NO_3)_2$, $MnSO_4$, manganese acetate, manganese dicarboxylate, manganese citrate, and fatty acid manganese salts; an oxyhydroxide, manganese chloride, and the like, and any one of the above or a mixture of two or more of the above may be used as the manganese raw material.

Examples of an aluminum raw material may include $AlSO_4$, $AlCl_3$, Al-isopropoxide, $AlNO_3$, or the like, and any one of the above or a mixture of two or more of the above may be used as the aluminum raw material.

An acetate, a nitrate, a sulfate, a halide, a sulfide, a hydroxide, an oxide, an oxyhydroxide, or the like including the element M2 may be used as the M2 raw material. For example, when M2 is Ti, a titanium oxide may be used.

The ammonium cation-containing complexing agent may be, specifically, $NH_4OH$, $(NH_4)_2SO_4$, $NH_4NO_3$, $NH_4Cl$, $CH_3COONH_4$, $NH_4CO_3$, or the like, and any one of the above or a mixture of two or more of the above may be used as the ammonium cation-containing complexing agent. Further, the ammonium cation-containing complexing agent may also be used in the form of an aqueous solution, and here, water or a mixture of water and an organic solvent (specifically, an alcohol or the like) that may be uniformly mixed with water may be used as a solvent.

The ammonium cation-containing complexing agent may be added in an amount such that the molar ratio is 0.5 to 1 with respect to 1 mol of the metal-containing solution. Generally, a chelating agent reacts with a metal at a molar ratio of 1:1 or higher to form a complex. However, because an unreacted complex in the formed complex that has not reacted with the basic aqueous solution may be changed into an intermediate product and be recovered as a chelating agent for reuse, the use amount of chelating agent may be lowered in the present invention in comparison to the general case. As a result, the crystallinity of the positive electrode active material may be improved, and the positive electrode active material may be stabilized.

The basic compound may be a hydroxide of an alkali metal or an alkaline earth metal such as $NaOH$, $KOH$, $Ca(OH)_2$, or the like or a hydrate thereof, and any one of the above or a mixture of two or more of the above may be used as the basic compound. The basic compound may also be used in the form of an aqueous solution, and here, water or a mixture of water and an organic solvent (specifically, an alcohol or the like) that may be uniformly mixed with water may be used as a solvent.

The coprecipitation reaction for forming the precursor may be performed under a condition in which pH is 11 to 13. When the pH deviates from the above range, there is a concern that the size of the fabricated precursor may be changed or particle fragmentation may be caused. Also, there is a concern that metal ions may be eluted at a surface of the precursor and form various oxides by side reaction. More specifically, the coprecipitation reaction may be performed under a condition in which pH of a mixture is 11 to 12.

The ammonium cation-containing complexing agent and the basic compound may be used in a molar ratio of 1:10 to 1:2 to satisfy the above-mentioned pH range. Here, the pH value refers to a pH value of a liquid at a temperature of 25° C.

The coprecipitation reaction may be performed at a temperature of 40° C. to 70° C. under an inert atmosphere of nitrogen or the like. Further, a stirring process may be selectively performed to increase a reaction speed during the reaction, and here, the stirring speed may be 100 rpm to 2,000 rpm.

When a concentration gradient of a metal element in the finally fabricated positive electrode active material is attempted to be formed, a metal-containing solution (hereinafter simply referred to as a second metal-containing solution) including nickel, cobalt, M1-containing raw material and, selectively, M2-containing raw material in different concentrations from the above-described metal-containing solution may be prepared, then, simultaneously, the second metal-containing solution may be added to the above-described metal-containing solution such that a mixing ratio of the above metal-containing solution and the second-metal containing solution is gradually changed from 100 vol %:0 vol % to 0 vol %:100 vol %, and the ammonium cation-containing complexing agent and the basic compound may be added thereto, and a reaction may be performed, thereby forming the concentration gradient.

In this way, by continuously increasing an amount of the second metal-containing solution being input into the above-described metal-containing solution and controlling a reaction speed and reaction time, a precursor that exhibits a concentration gradient in which concentrations of nickel, cobalt, and M1 independently continuously change from the center of the particle toward a surface thereof may be fabricated with a single coprecipitation reaction process. In this case, the concentration gradient of a metal in the resulting precursor and a slope of the concentration gradient may be easily adjusted by compositions and mixture supply ratios of the above-described metal-containing solution and the second metal-containing solution. Extending a reaction time and decreasing a reaction speed are preferable to reach a high density state in which a concentration of a specific metal is high, and shortening a reaction time and increasing a reaction speed are preferable to reach a low density state in which a concentration of a specific metal is low.

Specifically, the second metal-containing solution may be added to the above-described metal-containing solution such that a speed of adding the second metal-containing solution is continuously increased within the range of 1% to 30% of an initial input speed. Specifically, an input speed of the above-described metal-containing solution may be 150 ml/hr to 210 ml/hr, an input speed of the second metal-containing solution may be 120 ml/hr to 180 ml/hr, and the input speed of the second metal-containing solution may be continuously increased within the range of 1% to 30% of the initial input speed within the input speed range. Here, the reaction may be performed at 40° C. to 70° C. Also, a size of a precursor particle may be adjusted by adjusting a supply amount and reaction time of the second metal-containing solution with respect to the above-described metal-containing solution.

By the above process, a particle of a composite metal hydroxide is generated and precipitated in a reaction solution as a precursor. Specifically, the precursor may include a compound of Formula 2 below.

$Ni_{1-x-y}Co_xM1_yM3_zM2_w(OH_{1-a})_2$ [Formula 2]

(In Formula 2, M1, M2, M3, x, y, z, and w are the same as those defined above, and $0 \leq a \leq 0.5$)

The nickel raw material, the cobalt raw material, and the M1 raw material may be metal powder including respective metal elements. In this case, the precursor may be fabricated by mixing the powdery raw materials including respective metal elements and heat treating the mixture at 200° C. to 500° C.

Next, in the fabrication method for fabricating the positive electrode active material, Step 2 is a step of forming the lithium composite metal oxide of Formula 1 by mixing the precursor particle fabricated in Step 1 with the lithium raw material, the M3 raw material, and selectively with the M2 raw material and then sintering. Here, the M2 raw material is the same as that described above.

Examples of the lithium raw material may include a lithium-containing carbonate (for example, lithium carbonate or the like), a hydrate (for example, lithium hydroxide I hydrate (LiOH.H$_2$O) or the like), a hydroxide (for example, lithium hydroxide or the like), a nitrate (for example, lithium nitrate (LiNO$_3$) or the like), and a chloride (for example, lithium chloride (LiCl) or the like), and any one of the above or a mixture of two or more of the above may be used as the lithium-containing raw material. A use amount of the lithium-containing raw material may be determined in accordance with contents of lithium and a transition metal in the finally fabricated lithium composite metal oxide, and specifically, the lithium-containing raw material may be used in an amount such that the molar ratio between lithium included in the lithium raw material and the metal element (Me) included in the composite metal hydroxide (molar ratio of lithium/metal element (Me=the sum of metal elements in the precursor and the element M3) is 1.0 or higher, more specifically, 2.0 or higher.

An acetate, a nitrate, a sulfate, a halide, a sulfide, a hydroxide, an oxide, an oxyhydroxide, or the like including the element M3 may be used as the M3 raw material. For example, when M3 is W, a tungsten oxide may be used. The M3 raw material may be used within the range that allows a condition of a content of the element M3 in the finally fabricated positive electrode active material to be satisfied.

After the precursor is mixed with the lithium-containing raw material, the M3 raw material, and selectively with the M2 raw material, a preliminary heat treatment process at 250° C. to 500° C. may be selectively performed before the sintering process. By such a preliminary heat treatment process, a sintering rate during the subsequent sintering process may be increased.

The preliminary heat treatment process may be performed in one step or may also be performed in multiple steps at different temperatures.

The sintering process may be performed at 700° C. to 900° C. or 750° C. to 850° C.

The shape, size, aspect ratio, and orientation of the primary particle may be controlled by adjusting temperature during the sintering process, and the positive electrode active material having the above-described structure may be fabricated by performing the sintering process in the above temperature ranges. The sintering process may also be performed in multiple steps of two to three.

The sintering process may be performed in an air atmosphere or an oxygen atmosphere (for example, $O_2$ or the like), and more specifically, may be performed under an oxygen atmosphere at an oxygen partial pressure of 20 vol % or higher. The sintering process may be performed for 5 hours to 48 hours or for 10 hours to 20 hours under the above conditions.

The sintering process may be performed in the presence of a sintering additive.

When the sintering additive is added, crystals may be easily grown at low temperature, and non-uniform reaction may be minimized during dry mixing. Specifically, examples of the sintering additive may include boron-based compounds such as boric acid, lithium tetraborate, boron oxide, and ammonium borate, and any one or a mixture of two or more of the above may be used as the sintering additive. The sintering additive may be used in an amount of 0.2 parts by weight to 2 parts by weight, more specifically, 0.4 parts by weight to 1.4 parts by weight, with respect to 100 parts by weight of the precursor.

A moisture-removing agent may be selectively further added during the sintering process. Specifically, examples of the moisture-removing agent may include citric acid, tartaric acid, glycolic acid, maleic acid, or the like, and any one of the above or a mixture of two or more of the above may be used as the moisture-removing agent. The moisture-removing agent may be used in an amount of 0.01 to 2 parts by weight with respect to 100 parts by weight of the precursor.

In the fabrication method according to an embodiment of the present invention, a washing process and a drying process for removing impurities present on a surface of a reactant that is obtained as a result of the sintering may be performed in Step 3.

The washing process may be performed in accordance with a general method except that the washing process is performed so that the molar ratio of Li/Me' (Me'=the sum of metal elements, excluding lithium, in the positive electrode active material) in the product obtained as the result of the sintering is 1.0 to 1.5. Specifically, the washing process may be performed by washing using water or a lower alcohol having a carbon number of 1 to 4.

Also, the drying process may be performed in accordance with a general drying method. Specifically, the drying process may be performed using method such as heat treatment and hot air injection in the temperature range of 150° C. to 400° C., and more specifically, may be performed for 15 to 30 hours at the above temperature range.

By having a monolithic structure, the positive electrode active material fabricated by the above process can maintain a stable crystal structure even during charge/discharge such that there is not concern about a sharp decrease in a capacity due to a change in the crystal structure, and generation of surface impurities is minimized such that excellent high-temperature stability and capacity characteristic can be exhibited when the positive electrode active material is applied to a battery.

Accordingly, according to still another embodiment of the present invention, a positive electrode and a lithium secondary battery including the above-described positive electrode active material are provided.

Specifically, the positive electrode includes a positive electrode current collector and a positive electrode active material layer formed on the positive electrode current collector and including the above-described positive electrode active material.

The positive electrode current collector is not particularly limited as long as the positive electrode current collector does not cause a chemical change to a battery and has conductivity, and for example, stainless steel, aluminum, nickel, titanium, calcined carbon, or an aluminum or stainless steel whose surface is treated with carbon, nickel, titanium, silver, or the like may be used as the positive electrode current collector. Generally, the positive electrode current collector may have a thickness of 3 to 500 μm, and an adhesive force of a positive electrode active material may be improved by forming fine irregularities on a surface of the current collector. For example, the positive electrode current collector may be used in various forms such as a film, a sheet, a foil, a net, a porous body, a foam body, and a nonwoven fabric body.

In addition to the above-described positive electrode active material, the positive electrode active material layer may include a conductive material and a binder.

Here, the conductive material is used to impart conductivity to an electrode, and in a constituted battery, any conductive material can be used without particular limitations as long as the conductive material does not cause a chemical change and has electronic conductivity. Specific examples include graphite such as natural graphite or artificial graphite; a carbon-based material such as carbon black, acetylene black, Ketjen black, channel black, furnace black, lamp black, summer black, and carbon fiber; metal powder or metal fiber such as copper, nickel, aluminum, and silver; conductive whisker such as zinc oxide and potassium titanate; a conductive metal oxide such as titanium oxide; a conductive polymer such as a polyphenylene derivative, or the like, and any one or a mixture of two or more selected therefrom may be used as the conductive material. Generally, the conductive material may be included at 1 wt % to 30 wt % with respect to a total weight of the positive electrode active material layer.

The binder performs a role of improving adhesion between positive electrode active material particles and an adhesive force between the positive electrode active material and the current collector. Specific examples thereof include polyvinylidene fluoride (PVDF), a PVDF-hexafluoropropylene copolymer (PVDF-co-HFP), polyvinyl alcohol, polyacrylonitrile, carboxymethyl cellulose (CMC), starch, hydroxypropylcellulose, regenerated cellulose, polyvinyl pyrrolidone, tetrafluoroethylene, polyethylene, polypropylene, an ethylene-propylene-diene monomer (EPDM), a sulfonated EPDM, styrene butadiene rubber (SBR), fluororubber, or various copolymers thereof, and one or a mixture of two or more selected therefrom may be used as the binder. The binder may be included at 1 to 30 wt % with respect to the total weight of the positive electrode active material layer.

Except for use of the above-described positive electrode active material, the positive electrode may be fabricated in accordance with a general method of fabricating a positive electrode. Specifically, the positive electrode may be fabricated by applying a composition for forming a positive electrode active material layer that includes the above-described positive electrode active material and selectively includes the binder and the conductive material on the positive electrode current collector and then drying and rolling. Here, the types and contents of the positive electrode active material, the binder, and the conductive material are the same as those described above.

A solvent may be a solvent that is generally used in the art, examples of the solvent may include dimethyl sulfoxide (DMSO), isopropyl alcohol, N-methyl pyrrolidone (NMP), acetone, or water, and one or a mixture of two or more selected therefrom may be used as the solvent. A use amount of the solvent is sufficient as long as the solvent has a viscosity capable of allowing the positive electrode active material, the conductive material, and the binder to be dissolved or dispersed and exhibiting excellent thickness uniformity when applied layer for fabricating a positive electrode in consideration of a thickness of an applied slurry and a fabrication yield.

With another method, the positive electrode may be fabricated by casting the composition for forming the positive electrode active material layer on a separate support body and then laminating a film obtained by separation from the support body on the positive electrode current collector.

According to still another embodiment of the present invention, an electrochemical device including the positive electrode is provided. Specifically, the electrochemical device may be a battery, a capacitor, and the like, and more specifically, may be a lithium secondary battery.

Specifically, the lithium secondary battery includes a positive electrode, a negative electrode disposed opposite the positive electrode, a separator interposed between the positive electrode and the negative electrode, and an electrolyte, and the positive electrode is the same as that described above. Also, the lithium secondary battery may selectively further include a battery container configured to store an electrode assembly including the positive electrode, the negative electrode, and the separator, and a sealing member configured to seal the battery container.

In the lithium secondary battery, the negative electrode includes a negative electrode current collector and a negative electrode active material layer disposed on the negative electrode current collector.

The negative electrode current collector is not particularly limited as long as the negative electrode current collector does not cause a chemical change to a battery and has high conductivity, and for example, copper, stainless steel, aluminum, nickel, titanium, calcined carbon, or a copper or stainless steel whose surface is treated with carbon, nickel, titanium, silver, and the like, an aluminum-cadmium alloy etc. may be used as the negative electrode current collector. Generally, the negative electrode current collector may have a thickness of 3 to 500 μm, and, like the positive electrode current collector, an adhesive force of a negative electrode active material may be improved by forming fine irregularities on a surface of the current collector. For example, the negative electrode current collector may be used in various forms such as a film, a sheet, a foil, a net, a porous body, a foam body, and a nonwoven fabric body.

In addition to the above-described negative electrode active material, the negative electrode active material layer may selectively include a conductive material and a binder. As an example, the negative electrode active material layer may be fabricated by applying a composition for forming a negative electrode that includes the negative electrode active material and selectively includes the binder and the conductive material on the negative electrode current collector and then drying, or by casting the composition for forming the negative electrode on a separate support body and then laminating a film obtained by separation from the support body on the negative electrode current collector.

A compound capable of reversible intercalation and deintercalation of lithium may be used as the negative electrode active material. Specific examples include a carbonaceous material such as artificial graphite, natural graphite, graphitized carbon fiber, and amorphous carbon; a metallic compound capable of being formed into an alloy with lithium, such as Si, Al, Sn, Pb, Zn, Bi, In, Mg, Ga, Cd, an Si-alloy, an Sn-alloy, and an Al-alloy; a metal oxide capable of doping and dedoping lithium, such as SiOx (0<x<2), SnO2, vanadium oxide, and lithium vanadium oxide; or a composite including the metallic compound and the carbonaceous material, such as an Si—C compound or an Sn—C compound, and one or a mixture of two or more selected therefrom may be used as the negative electrode active material. Also, a metal lithium thin film may be used as the negative electrode active material. Both low crystalline carbon and high crystalline carbon may be used as the carbon material. Soft carbon and hard carbon are typical low crystalline carbon, and high-temperature calcined carbons such as amorphous, plate-shaped, flake-shaped, spherical, or fiber type natural graphite or artificial graphite, Kish graphite, pyrolytic carbon, mesophase pitch based carbon fiber, meso-carbon microbeads, mesophase pitches, and petroleum or coal tar pitch derived cokes are typical high crystalline carbon.

Also, the binder and the conductive material may be the same as those described above with respect to the positive electrode.

In the lithium secondary battery, the separator separates the negative electrode and the positive electrode and provides a movement path for lithium ions, and anything that is generally used as a separator in a lithium secondary battery may be used without particular limitation. Particularly, it is preferable that the separator have low resistance with respect to ion movement in an electrolyte and have excellent ability of impregnating an electrolyte. Specifically, a porous polymer film, for example, a porous polymer film fabricated with a polyolefin-based polymer such as an ethylene homopolymer, a propylene homopolymer, an ethylene-butene copolymer, an ethylene-hexene copolymer, and an ethylene-methacrylate copolymer or a stacked structure of two or more layers thereof may be used. Also, a general porous nonwoven fabric, for example, a nonwoven fabric formed of high-melting-point glass fiber, polyethylene terephthalate fiber, or the like may be used. A coated separator including a ceramic component or a polymer material for securing heat resistance or mechanical strength may be used, and may be used in a single-layer or multi-layer structure.

Examples of an electrolyte used in the present invention may include an organic liquid electrolyte, an inorganic liquid electrolyte, a solid polymer electrolyte, a gel-type polymer electrolyte, an inorganic solid electrolyte, and a molten-type inorganic electrolyte, which can be used in the manufacture of a lithium secondary battery, but the present invention is are not limited thereto.

Specifically, the electrolyte may include an organic solvent and a lithium salt.

Anything that can serve as a medium capable of moving ions that are involved in an electrochemical reaction of a battery can be used as the organic solvent without particular limitation. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethylcarbonate (DMC), diethylcarbonate (DEC), methylethylcarbonate (MEC), ethylmethylcarbonate (EMC), ethylene carbonate (EC), and propylene carbonate (PC); an alcohol-based solvent such as ethyl alcohol and isopropyl alcohol; nitriles such as R—CN (R is a linear, branched, or cyclic hydrocarbon group of C2 to C20, and may include a double bond aromatic ring or an ether bond); amides such as dimethylformamide; dioxolanes such as 1.3-dioxolane; or sulfolane may be used as the organic solvent. Among these, the carbonate-based solvent is preferable, and a mixture of a cyclic carbonate (for example, EC or PC) having high ion conductivity and a high dielectric constant capable of improving the charge/discharge performance of a battery and a linear carbonate-based compound (for example, EMC, DMC, or DEC) having a low viscosity is more preferable. In this case, excellent performance of an electrolyte may be exhibited when the cyclic carbonate and the chain carbonate are mixed in a volume ratio of about 1:1 to 1:9 and used.

Any compound capable of providing lithium ions used in a lithium secondary battery may be used as the lithium salt without particular limitation. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, $LiB(C_2O_4)_2$, or the like may be used as the lithium salt. The concentration of the lithium salt is preferably in the range of 0.1 to 2.0 M. When the concentration of the lithium salt is within the above range, because the electrolyte has an appropriate conductivity and viscosity, the electrolyte can exhibit excellent electrolyte performance, and the lithium ions can effectively move.

For purposes of improving a lifespan characteristic of a battery, suppressing a decrease in battery capacity, improving a discharge capacity of a battery, and the like, for example, the electrolyte may further include one or more additives such as haloalkylene carbonate-based compound such as difluoroethylene carbonate or the like, pyridine, triethyl phosphite, triethanolamine, cyclic ether, ethylenediamine, n-glyme, hexaphosphate triamide, a nitrobenzene derivative, sulfur, quinone imine dyes, N-substituted oxazolidinone, N,N-substituted imidazolidine, ethylene glycol dialkyl ether, ammonium salt, pyrrole, 2-methoxyethanol, aluminum trichloride, or the like in addition to the components of the electrolyte. Here, the additive may be included at 0.1 to 5 wt % with respect to the total weight of the electrolyte.

Because the lithium secondary battery including the positive electrode active material according to the present invention stably exhibits an excellent discharge capacity, output characteristic, and capacity retention as described above, the lithium secondary battery is useful for portable devices such as a mobile phone, a laptop computer, and a digital camera and in the electric vehicle field including a hybrid electric vehicle (HEV).

Accordingly, according to another implementation of the present invention, a battery module including the lithium secondary battery as a unit cell and a battery pack including the same are provided.

The battery module or battery pack may be used as a power source of a medium to large sized device of one or more of a power tool; an electric car including an electric vehicle (EV), a hybrid electric vehicle, and a plug-in hybrid electric vehicle (PHEV); or a power storage system.

[Mode]

Hereinafter, an embodiment of the present invention will be described in detail so that one of ordinary skill in the art to which the present invention pertains can easily practice the present invention. However, the present invention may be implemented in various other forms and is not limited to the embodiment described herein.

Example 1-1: Fabrication of Positive Electrode Active Material

In a batch-type 5 L reactor set at 60° C., nickel sulfate, cobalt sulfate, and manganese sulfate were mixed in a molar ratio of 60:20:20 in water to prepare a metal-containing solution at a concentration of 2 M.

A vessel containing the metal-containing solution was connected to enter the reactor, and a 4 M NaOH solution and a $NH_4OH$ aqueous solution at a concentration of 7% were prepared and connected to the reactor, respectively. 3 L of deionized water was added to a coprecipitation reactor (capacity: 5 L), the reactor was purged with nitrogen gas at a rate of 2 L/minute to remove oxygen dissolved in water, and a non-oxidizing atmosphere was formed in the reactor. Then, 100 ml of 4M NaOH was added thereto, and the mixture was maintained at pH 12.0 at a stirring speed of 1,200 rpm at 60° C. Then, the metal-containing solution, the NaOH aqueous solution, and the $NH_4OH$ aqueous solution were added at 180 ml/hr, 180 ml/hr, and 10 ml/hr, respectively and reacted for 24 hours to form a nickel-manganese-cobalt based composite metal hydroxide as a precursor.

The precursor was mixed with lithium hydroxide as a lithium raw material and tungsten oxide ($WO_3$) as a tungsten raw material such that the molar ratio of M (the sum of Ni, Mn, and Co):Li:W was 0.995:2.0:0.005. Also, 0.5 parts by weight of boron oxide ($B_2O_3$) was added as a sintering additive with respect to 100 parts by weight of the precursor. Then, a lithium composite metal oxide was fabricated by performing a heat treatment for 10 hours at 820° C. under an oxygen atmosphere (oxygen partial pressure 20%). The lithium composite metal oxide and distilled water were mixed in a ratio of 1:1 and stirred for 10 minutes at a speed of 1,000 rpm, residual lithium on a surface was removed, and drying was performed for 12 hours in an oven at 150° C., thereby fabricating a positive electrode active material, ($Li_{1.07}(Ni_{0.6}Mn_{0.2}Co_{0.2})_{0.995}W_{0.005}O_2$), having a monolithic structure.

Example 1-2: Fabrication of Positive Electrode Active Material

In a batch-type 5 L reactor set at 60° C., nickel sulfate, cobalt sulfate, manganese sulfate, and magnesium sulfate were mixed in a molar ratio of 60:20:20:0.2 in water to prepare a metal-containing solution at a concentration of 2M, and nickel sulfate, cobalt sulfate, manganese sulfate, and magnesium sulfate were mixed in a molar ratio of 40:30:30:0.02 in water to prepare a second metal-containing solution at a concentration of 2M. A vessel containing the metal-containing solution was connected to enter the reactor, and a vessel containing the second metal-containing solution was connected to enter the metal-containing solution vessel. In addition, a 4M NaOH solution and a $NH_4OH$ aqueous solution at a concentration of 7% were prepared and connected to the reactor, respectively. 3 L of deionized water was added to a coprecipitation reactor (capacity: 5 L), the reactor was purged with nitrogen gas at a rate of 2 L/minute to remove oxygen dissolved in water, and a non-oxidizing atmosphere was formed in the reactor. Then, 100 ml of 4M NaOH was added thereto, and the mixture was maintained at pH 12.0 at a stirring speed of 1,200 rpm at 60° C. Then, the metal-containing solution, the NaOH aqueous solution, and the $NH_4OH$ aqueous solution were added at 180 ml/hr, 180 ml/hr, and 10 ml/hr, respectively and reacted for 30 minutes to form a seed of a hydroxide of a first metal-containing solution. Then, the second metal-containing solution was added to the first metal-containing solution vessel at 150 ml/hr to induce growth of the hydroxide particle and induce formation of a concentration gradient inside the particle. Then, the reaction was maintained for 24 hours to grow nickel-manganese-cobalt-based composite metal hydroxide. A resultant particle of the nickel-manganese-cobalt-based composite metal hydroxide formed was separated, washed, and then dried in an oven at 120° C. to fabricate a precursor.

The resultant precursor formed was mixed with lithium hydroxide as a lithium raw material and tungsten oxide ($WO_3$) as a tungsten raw material such that the molar ratio of M (the sum of Ni, Mn, and Co)Mg:Li:W was 0.975:0.02:2.0:0.005. Also, 0.5 parts by weight of boron oxide ($B_2O_3$) was added as a sintering additive with respect to 100 parts by weight of the precursor. Then, a lithium composite metal oxide was fabricated by performing a heat treatment for 10 hours at 820° C. under an oxygen atmosphere (oxygen partial pressure 20%). The lithium composite metal oxide and distilled water were mixed in a ratio of 1:1 and stirred for 10 minutes at a speed of 1,000 rpm, residual lithium on a surface was removed, and drying was performed for 12 hours in an oven at 150° C., thereby fabricating a positive electrode active material, ($Li_{1.07}(Ni_{0.6}Mn_{0.2}Co_{0.2})_{0.975}Mg_{0.02}W_{0.005}O_2$), having a monolithic structure.

Comparative Example 1-1: Fabrication of Positive Electrode Active Material

In a batch-type 5 L reactor set at 60° C., nickel sulfate, cobalt sulfate, and manganese sulfate were mixed in a molar ratio of 60:20:20 in water to prepare a metal-containing solution at a concentration of 2 M. A vessel containing the metal-containing solution was connected to enter the reactor, and a 4M NaOH solution and a $NH_4OH$ aqueous solution at a concentration of 7% were prepared and connected to the reactor, respectively. 3 L of deionized water was added to a coprecipitation reactor (capacity: 5 L), the reactor was purged with nitrogen gas at a rate of 2 L/minute to remove oxygen dissolved in water, and a non-oxidizing atmosphere was formed in the reactor. Then, 100 ml of 4M NaOH was added thereto, and the mixture was maintained at pH 12.0 at a stirring speed of 1,200 rpm at 60° C. Then, the metal-containing solution, the NaOH aqueous solution, and the $NH_4OH$ aqueous solution were added at 180 ml/hr, 180 ml/hr, and 10 ml/hr, respectively and reacted for 24 hours to form a nickel-manganese-cobalt-based composite metal hydroxide as a precursor.

The precursor was mixed with lithium hydroxide as a lithium raw material such that the molar ratio of Li:M (the sum of Ni, Mn, and Co) was 1:1.07, and then a heat treatment was performed for 10 hours at 820° C. under an oxygen atmosphere (oxygen partial pressure 20%) to fabricate a positive electrode active material, ($Li_{1.07}(Ni_{0.6}Mn_{0.2}Co_{0.2})O_2$).

Comparative Example 1-2: Fabrication of Positive Electrode Active Material

The positive electrode active material, ($Li_{1.07}(Ni_{0.6}Mn_{0.2}Co_{0.2})_{0.95}W_{0.05}O_2$), was fabricated by the same method as in Example 1-1 above except that the precursor, lithium hydrate as a lithium raw material and tungsten oxide ($WO_3$) as a tungsten raw material were used such that the molar ratio of M (the sum of Ni, Mn, and Co):Li:W was 0.95:2.0:0.05 in Example 1-1 above.

Comparative Example 1-3: Fabrication of Positive Electrode Active Material

The positive electrode active material, ($Li_{1.07}(Ni_{0.6}Mn_{0.2}Co_{0.2})_{0.995}W_{0.005}O_2$), was fabricated by the same method as in Example 1-1 above except that the heat treatment was performed for 10 hours at 1,050° C. in the presence of boron oxide after the precursor was mixed with lithium hydroxide and tungsten oxide in Example 1-1 above.

Examples 2-1, 2-2 and Comparative Examples 2-1 to 2-3: Fabrication of Lithium Secondary Battery A lithium secondary battery was fabricated using each of the positive electrode active materials fabricated in Examples 1-1, 1-2 and Comparative Examples 1-1 to 1-3.

Specifically, each of the positive electrode active materials fabricated in Examples 1-1, 1-2 and Comparative Examples 1-1 to 1-3, carbon black which is a conductive material, and PVDF which is a binder were mixed in a weight ratio of 95:2.5:2.5 in an N-methyl pyrrolidone solvent to fabricate a composition for forming a positive electrode (viscosity: 5,000 mPa·s), and the composition was applied on an aluminum current collector, dried at 130° C., and rolled to fabricate a positive electrode.

Also, natural graphite as a negative electrode active material, carbon black as a conductive material, and PVDF as a binder were mixed in a weight ratio of 85:10:5 in an N-methyl pyrrolidone (NMP) solvent to fabricate a composition for forming a negative electrode, and the composition was applied on a copper current collector to fabricate a negative electrode.

A porous polyethylene separator was interposed between the positive electrode and the negative electrode fabricated as above to fabricate an electrode assembly, the electrode assembly was placed inside a case, and then an electrolyte was injected into the case to fabricate a lithium secondary battery. Here, the electrolyte was fabricated by dissolving lithium hexafluorophosphate ($LiPF_6$) at a concentration of 1.0M in an organic solvent consisting of EC/DMC/EMC in a mixture volume ratio of 3:4:3.

Experiment Example 1: Observation of Crystal Structure of Positive Electrode Active Material The positive electrode active material fabricated in Example 1-1 was observed with a scanning electron microscope, and a result thereof is shown in the figure.

From the figure, it can be confirmed that the positive electrode active material fabricated in accordance with Example 1-1 is a primary particle having a monolithic structure and a hexahedral shape, and a size thereof is uniform.

Experiment Example 2: Analysis of Concentration Gradient of Metal Elements in Positive Electrode Active Material To confirm a distribution of metal elements in a positive electrode active material particle fabricated in Example 1-2 above, etching was performed on the active material using HCl for various times, and elution amounts of the elements according to etching time or dissolution time were analyzed through inductively coupled plasma (ICP) analysis. A result thereof is shown in Table 1 below.

TABLE 1

| Dissolution time (minutes) | Distance from particle surface (μm) | Example 1-2(molar ratio) | | | | |
|---|---|---|---|---|---|---|
| | | Ni | Co | Mn | Mg | W |
| 0 | 0 | 0.476 | 0.252 | 0.247 | 0.020 | 0.005 |
| 1 | 0.1 | 0.506 | 0.242 | 0.233 | 0.016 | 0.003 |
| 5 | 0.3 | 0.547 | 0.230 | 0.215 | 0.008 | 0 |
| 10 | 0.8 | 0.574 | 0.212 | 0.211 | 0.003 | 0 |
| 30 | 1.1 | 0.596 | 0.203 | 0.199 | 0.002 | 0 |
| 120 | 2.2 (particle center) | 0.612 | 0.196 | 0.192 | 0 | 0 |

Scanning positions in Table 1 above are shown in the figure.

As a result of the experiment, it was confirmed that Ni, Co, and Mn are included with a concentration gradient in which a concentration of Ni decreases and concentrations of Co and Mn increase from the center of the active material particle toward the surface thereof. Mg was present with a concentration gradient that decreases from the surface of the particle toward the center thereof.

Experiment Example 2: Analysis of Positive Electrode Active Material

An average particle size, a specific surface area, and a rolling density of the positive electrode active material fabricated in Example 1-1 was measured, and a result thereof is shown in Table 2 below.

(1) Average particle size ($D_{50}$): The positive electrode active material particle was introduced into a laser diffraction particle size measurement device (for example, Microtrac MT 3000), and then an ultrasonic wave of about 28 kHz was radiated with an output of 60 W to calculate the average particle size ($D_{50}$) based on a particle size distribution at 50% in the measurement device.

(2) Particle size distribution value (Dcnt): a number average particle size measured under 90% (Dn90), a number average particle size measured under 10% (Dn10), and a number average particle size measured under 50% (Dn50) of the positive electrode active material fabricated in Example 1-1 were measured in an absorption mode using a Microtrac particle size analyzer after the positive electrode active material fabricated in Example 1-1 was left in distilled water for 3 hours, and then the particle size distribution value was calculated in accordance with Equation 1 below.

$$Dcnt=[Dn90-Dn10]/Dn50 \quad \text{[Equation 1]}$$

(3) BET specific surface area: the specific surface area of the positive electrode active material was measured using the BET method, and specifically, the specific surface area was calculated from a nitrogen gas absorption amount under a liquid nitrogen temperature (77K) using BELSORP-mini II of BEL Japan company.

(4) Rolling density: the rolling density was measured under a pressure of 2 tonf/cm² using a rolling density measuring device (HPRM-A1, Han Tech Company Ltd.).

TABLE 2

| Type | Example 1-1 | Example 1-2 | Comparative Example 1-1 | Comparative Example 1-2 | Comparative Example 1-3 |
|---|---|---|---|---|---|
| Particle structure | Primary particle having monolithic structure | Primary particle having monolithic structure | Secondary particle | Secondary particle | Primary particle having monolithic structure |
| Average particle size ($D_{50}$) (μm) | 4.6 | 4.4 | 5.8[1] | 5.3[1] | 6.4 |
| Particle size distribution value (Dcnt) | 0.65 | 0.59 | 0.32 | 0.44 | 0.95 |
| BET specific surface area (m²/g) | 0.15 | 0.21 | 1.45 | 1.84 | 0.12 |
| Rolling density (g/cc) | 3.28 | 3.16 | 2.24 | 2.07 | 2.87 |

[1] is an average particle size of a secondary particle

Referring to Table 2, although each of the positive electrode active materials of Example 1-1 and Example 1-2 were primary particles having a monolithic structure, the positive electrode active materials of Comparative Example 1-1 and Comparative Example 1-2 were secondary particles. It was confirmed that the positive electrode active materials of Example 1-1 and Example 1-2 had a higher rolling density than the positive electrode active materials of Comparative Example 1-1 and Comparative Example 1-2 in the form of a secondary particle and had a higher rolling density than the positive electrode active material of Comparative Example 1-3 in the form of a primary particle having a monolithic structure.

Experiment Example 3: Evaluation of Positive Electrode Active Material

A coin cell (negative electrode: Li metal) fabricated using each of the positive electrode active materials fabricated in Example 1-1 and Comparative Examples 1-1 to 1-3 was charged until a constant current (CC) of 0.1 C until 4.25 V at 25° C., and then charging at a constant voltage (CV) of 4.25 V was performed, thereby performing one-time charging until a charging current reached 0.05 mAh. Then, the coin cell was left for 20 minutes and then discharged until 3.0 V at the constant current of 0.1 C to measure a first-cycle discharge capacity. Then, each of charge/discharge capacity, charge/discharge efficiency, and rate capability was evaluated after changing a discharge condition to 2 C. A result thereof is shown in Table 3 below.

TABLE 3

| | First charge/discharge | | | 2 C rate | |
|---|---|---|---|---|---|
| Type | Charge capacity (mAh/g) | Discharge capacity (mAh/g) | Charge/ discharge efficiency (%) | Capacity (mAh/g) | 2.0 C/ 0.1 C (%) |
| Example 1-1 | 193.2 | 178.3 | 92.3 | 161.2 | 90.4 |
| Comparative Example 1-1 | 195.1 | 177.5 | 91.0 | 156.9 | 88.3 |
| Comparative Example 1-2 | 171.4 | 154.6 | 90.2 | 139.3 | 90.1 |

TABLE 3-continued

| | First charge/discharge | | | 2 C rate | |
|---|---|---|---|---|---|
| Type | Charge capacity (mAh/g) | Discharge capacity (mAh/g) | Charge/ discharge efficiency (%) | Capacity (mAh/g) | 2.0 C/ 0.1 C (%) |
| Comparative Example 1-3 | 190.5 | 168.4 | 88.4 | 142.0 | 84.3 |

Referring to Table 3, a coin cell including the positive electrode active material of Example 1-1 exhibited further improved charge/discharge efficiency, capacity characteristics, and rate capability than coin cells including the positive electrode active materials of Comparative Example 1-1 to Comparative Example 1-3.

Experiment Example 5: Evaluation of Battery Characteristics of Lithium Secondary Battery Battery characteristics of lithium secondary batteries (Example 2-1 and Comparative Examples 2-1 to 2-3) respectively including the positive electrode active materials in Example 1-1 and Comparative Examples 1-1 to 1-3 were evaluated using a method below.

Specifically, charge/discharge was performed for 300 times under a 1 C/2 C condition within a driving voltage range of 2.8 V to 4.15 V at a temperature of 45° C. with respect to the lithium secondary battery.

As a result thereof, a cycle capacity retention rate, which is a ratio of a discharge capacity at the 300th cycle to an initial capacity after charge/discharge is performed 300 times at high temperature (45° C.) was measured and is shown in Table 4 below.

TABLE 4

| Type | 300$^{th}$ cycle capacity retention rate(%) at high temperature (45° C.) |
|---|---|
| Example 2-1 | 90.4 |
| Comparative Example 2-1 | 82.7 |
| Comparative Example 2-2 | 67.1 |
| Comparative Example 2-3 | 38.4 |

As a result of the experiment, it was confirmed that the lithium secondary battery using the positive electrode active material fabricated in Example 2-1 exhibited superior output characteristics at room temperature and high temperature and superior cycle characteristics in comparison to Comparative Example 2-1 to Comparative Example 2-3.

The invention claimed is:

1. A positive electrode active material for a secondary battery, the positive electrode active material being a primary particle having a monolithic structure that includes a lithium composite metal oxide of Formula 1 below, wherein the primary particle has an average particle size ($D_{50}$) of 2 μm to 20 μm and a Brunauer-Emmett-Teller (BET) specific surface area of 0.15 m²/g to 0.5 m²/g, wherein the lithium composite metal oxide is formed by sintering at 700° C. to 900° C. in the presence of a boron-based sintering additive:

$Li_aNi_{1-x-y}Co_xM1_yM3_zM2_wO_2$ [Formula 1]

wherein, in Formula 1, M1 is Mn or combination of Mn and Al, M2 is any one or two elements selected from the group consisting of Zr and Mg, M3 is W, and 1.0≤a≤1.5, 0<x<0.5, 0<y≤0.5, 0.005≤z<0.01, 0≤w≤0.04, 0<x+00.7.

2. The positive electrode active material of claim 1, wherein in Formula 1, 0.4<x+y<0.7.

3. The positive electrode active material of claim 1, wherein at least one metal element of nickel, M1, and cobalt exhibits a concentration gradient that changes in the active material.

4. The positive electrode active material of claim 1, wherein:
nickel, M1, and cobalt independently exhibit a concentration gradient that changes throughout the active material;
the concentration of nickel decreases with a concentration gradient in a direction from a center of the active material to a surface thereof; and
the concentrations of cobalt and M1 independently increases with a concentration gradient in the direction from the center of the active material to the surface thereof.

5. The positive electrode active material of claim 1, wherein the M1 is manganese (Mn).

6. The positive electrode active material of claim 1, wherein the positive electrode active material has a polyhedral shape.

7. The positive electrode active material of claim 1, wherein the positive electrode active material has a particle size distribution value (Dcnt), which is defined by Equation 1 below, of 0.5 to 1.0

Dcnt=[Dn90-Dn10]/Dn50 [Equation 1]

wherein, in Equation 1, Dn90, Dn10, and Dn50 are number average particle sizes measured under 90%, 10%, and 50%, respectively.

8. The positive electrode active material of claim 1, wherein the positive electrode active material has a rolling density of 3.0 g/cc or higher under a pressure of 2 ton·f.

9. The positive electrode active material of claim 1, wherein the average particle size ($D_{50}$) of the primary particle is 2 μm to 8 μm.

10. The positive electrode active material of claim 3, wherein the concentration gradient that changes throughout the active material of at least one of nickel, M1, and cobalt independently changes in a direction from a center of the active material to a surface thereof at a constant slope.

11. A positive electrode for a secondary battery, the positive electrode comprising the positive electrode active material of claim 1.

12. A lithium secondary battery comprising the positive electrode of claim 11.

13. A method of fabricating the positive electrode active material for a secondary battery of claim 1, the method comprising:
a step of preparing a precursor by mixing a nickel raw material, a cobalt raw material, and an M1 raw material, wherein M1 is Mn or the combination of Al and Mn, and then performing a reaction;
a step of mixing the precursor with a lithium raw material and a W raw material such that a molar ratio of Li/Me, wherein Me=the sum of metal elements in the precursor and W, is 2.0 or higher and then sintering at 700° C. to 900° C. in the presence of the boron-based sintering additive; and
a step of washing a product obtained by a result of the sintering such that a molar ratio of Li/Me', wherein Me'=the sum of metal elements, excluding lithium, in the positive electrode active material in the finally fabricated positive electrode active material is from 1.0 to 1.5 and then drying at 150° C. to 400° C.

14. The method of claim 13, wherein an M2 raw material, wherein M2 is any one or two elements selected from the group consisting of Zr and Mg, is further added in the preparing of the precursor or the sintering.

15. The method of claim 13, wherein the precursor is fabricated by adding an ammonium cation-containing complexing agent and a basic compound to a metal-containing solution, which is produced by mixing the nickel raw material, the cobalt raw material, and the M1 raw material and performing a coprecipitation reaction.

16. The method of claim 15, wherein a second metal-containing solution including the nickel raw material, the cobalt raw material, and the M1 raw material in different concentrations from the metal-containing solution is further added to the metal-containing solution.

17. The method of claim 13, wherein the boron-based sintering additive includes any one or two or more selected from the group consisting of boric acid, lithium tetraborate, boron oxide, and ammonium borate.

\* \* \* \* \*